United States Patent [19]
van der Lely et al.

[11] Patent Number: 5,826,536
[45] Date of Patent: Oct. 27, 1998

[54] CONSTRUCTION INCLUDING AN IMPLEMENT FOR MILKING ANIMALS

[76] Inventors: Cornelis van der Lely, 7 Brüschenrain, CH-6300 Zug, Switzerland; Karel van den Berg, 5, Boterbloemstraat, 2971 BR Bleskensgraaft, Netherlands

[21] Appl. No.: 551,844

[22] Filed: Nov. 7, 1995

[30] Foreign Application Priority Data

Mar. 25, 1994 [NL] Netherlands ............................ 9400471
Mar. 29, 1994 [NL] Netherlands ............................ 9400495

[51] Int. Cl.⁶ ........................................................ A01J 5/017
[52] U.S. Cl. ............................................ 119/14.02; 119/14.08; 119/14.18
[58] Field of Search ...................... 119/14.02, 14.03, 119/14.08, 14.1, 14.18, 51.02

[56] References Cited

U.S. PATENT DOCUMENTS

| | | | |
|---|---|---|---|
| 3,726,252 | 4/1973 | Needham et al. | 119/14.08 |
| 4,726,322 | 2/1988 | Torsius | 119/14.14 |
| 4,805,557 | 2/1989 | van der Lely et al. | 119/14.08 |
| 4,805,559 | 2/1989 | van der Lely et al. | 119/14.1 |
| 4,838,207 | 6/1989 | Bom et al. | 119/14.02 |
| 4,936,256 | 6/1990 | Pera | 119/14.08 |
| 5,020,477 | 6/1991 | Dessing et al. | 119/14.08 |
| 5,080,040 | 1/1992 | van der Lely et al. | 119/14.09 |

FOREIGN PATENT DOCUMENTS

| | | | |
|---|---|---|---|
| 0 302 559 A1 | 2/1989 | European Pat. Off. | A01J 7/00 |
| 0 360 354 A1 | 3/1990 | European Pat. Off. | A01J 7/00 |
| 0 448 132 A3 | 9/1991 | European Pat. Off. | A01J 7/00 |
| 0 532 066 A1 | 3/1993 | European Pat. Off. | A01J 7/00 |
| 0 551 956 A1 | 7/1993 | European Pat. Off. | A01J 7/00 |
| 0 565 189 A3 | 10/1993 | European Pat. Off. | A01J 7/00 |

OTHER PUBLICATIONS

Samenwerkingsverdrag (PCT), Form PCT/ISA/201(a) Aug. 1994, dated Dec. 5, 1994 (Untranslated).

*Primary Examiner*—Michael J. Carone
*Assistant Examiner*—Elizabeth Shaw
*Attorney, Agent, or Firm*—Penrose Lucas Albright

[57] ABSTRACT

An apparatus for automatically milking animals, such as cows, comprising a milking robot provided for teat cups which are movably connected by articulated movable arms to the remainder of the milking robot. The articulated arms are configured by eight stepping motors which are controlled, via a computer, by signals from a detector on the milking robot which detects the location of the animal's teats, whereupon the teat cups are adjusted so that each teat cup is under a corresponding teat of the animal, and the teat cups are raised to be coupled with the animal's teats. The teat cups are connected to the pivotable robot arms by cords or cables which are connected on their other ends to cylinder/piston units so as to draw the teat cups taut against the ends of the arms when the teat cups are being emplaced on the animal's teats and the cords or cables are played out after such emplacement so that the animal can move, within limits, without dislodging the teat cups or being impeded by them. If a teat cup is accidentally dislodged from a teat during milking, it is pulled taut against the corresponding arm and again emplaced on the corresponding animal's teat. The teat cups are connectable to the animal's teats both simultaneously and individually, one after the other. The apparatus includes a compartment for milking an animal with an identification system which, based on data concerning the animal, controls whether the animal will be permitted to enter the compartment and be milked.

35 Claims, 4 Drawing Sheets

CONSTRUCTION INCLUDING AN IMPLEMENT FOR MILKING ANIMALS

RELATED APPLICATIONS

This Patent Application is a Continuation of PCT/NL95/00101 (filed Mar. 20, 1995 designating the United States), which claims the priority dates of The Netherlands' Patent Application 9400471, filed Mar. 25, 1994 and The Netherlands' Patent Application 9400495, filed Mar. 29, 1994.

FIELD OF THE INVENTION

The present invention relates to an apparatus for automatically milking animals, such as cows, comprising a milking robot provided with teat cups. In particular it relates to a milking robot for locating the teats of an animal in a milking compartment and emplacing the teat cups on the animal's teats.

SUMMARY OF THE INVENTION

In order to facilitate the connecting of the teat cups to the teats of an animal and in order to make the milking for the animal more comfortable, the apparatus according to the invention is characterized in that at least a number of teat cups are movably connected by means of movable arms to a robot arm, said teat cups being capable of moving freely in respect to the movable arms with the aid of flexible elements, such as cables or cords. Movable arms are to be understood to mean arms or other elements which are movable relative to each other as well as relative to the robot arm. The capability of moving the teat cups relative to the robot arm provides for an efficient emplacement of the teat cups on the teats, while the connection of the teat cups to the movable arms by means of flexible elements, such as cables or cords, provides additional freedom for movement by the animal during milking. In accordance with the invention, the construction makes it possible for at least two teat cups to be connectable to the teats of an animal, both simultaneously or one after the other. The invention, therefore, also relates to an apparatus for automatically milking animals, such as cows, comprising a milking robot provided with teat cups, the apparatus being characterized in that at least two teat cups are connectable to the teats of an animal either simultaneously or one after the other. Consequently, the teat cups can optionally be connected to the teats of more different types of animals, so that more animals can be milked by the apparatus.

In accordance with a further feature of the invention, a teat cup that can be connected pivotably, rotatably or telescopically to a robot arm, is provided with a flexible element, such as a cable or cord, for withdrawing the teat cup. The invention, therefore, also relates to an apparatus for automatically milking animals, such as cows, comprising a milking robot provided with teat cups, the construction being characterized in that a teat cup is connected pivotably, rotatably or telescopically to a robot arm, and the teat cup is provided with a flexible element, such as a cord or cable, for withdrawing the teat cup.

To ensure the occurrence of minimal obstruction during implacement of the teat cups on the animal's teats, a teat cup is connected to a robot arm so that it is rotatable about its longitudinal axis. The invention, therefore, also relates to an apparatus for automatically milking animals, such as cows, comprising a milking robot having a robot arm provided with teat cups, the construction being characterized in that a teat cup is connected to the robot arm in such a manner that it is rotatable about its longitudinal axis.

A very advantageous arrangement of the teat cups under the udder of the animal is obtained when the teat cups are pivotably connected to a robot arm so that in a first position, seen in plan view, the cups are located near the midway point of the udder and in a second position, also seen in plan view, they are located remote from a midway point of the udder. The invention, therefore, also relates to an apparatus for automatically milking animals, such as cows, comprising a milking robot provided with teat cups, characterized in that the teat cups are pivotably coupled to a robot arm in such a manner that in a first position, seen in plan view, the cups are located near the midway point of the udder and in a second position, also seen in plan view, they are located remote from the midway point of the udder. In particular, a teat cup is attached to the robot arm by means of three pivotal arms. The mode of connection of all four teat cups may be such that they are attached in pairs via two common pivotal arms to the robot arm. In this situation, the teat cups can be movable relative to the robot arm with the aid of stepping motors. These stepping motors may be located in the pivot points provided between the teat cups and the robot arm. Thus, in the embodiment disclosed, eight stepping motors control the movement of four teat cups relative to the robot arm. Further, in the disclosed advantageous embodiment, a teat cup may be connected to the robot arm via three pivotal arms in such a manner that the teat cup is rotatable about its longitudinal axis. The teat cup is received in a sleeve which is freely rotatably about the exterior housing of the teat cup, the teat cup being connected to the robot arm via this sleeve.

A teat cup is also connected to its corresponding pivotal arm by means of a flexible element, such as a cable or cord. This flexible element is passed through or along the pivotal arms and by such means the teat cup is connected to the robot arm. Within the robot arm, the flexible element is further connected to an operating cylinder/piston unit, preferably a pneumatic cylinder/piston unit. The flexible element acts on the teat cup through its connection to the sleeve that surrounds the exterior housing of the teat cup and in which the teat cup is rotatable about its longitudinal axis. The sleeve has a bulging portion to which the flexible member is connected and which, when the teat cup is pulled against the relevant pivotal arm, fits in a recess at the end of that arm.

In accordance with a still further feature of the invention, the apparatus includes a detector for determining the position of the teats of an animal to be milked, which detector is positioned during coupling of the teat cups to the teats so as to be substantially stationary and approximately in a central position under the animal to be milked. In this situation, the detector is located on either a separate robot arm, or on the robot arm to which the teat cups are connected via pivotal arms. In the latter case, the teat cups are, while being connected, movable with respect to the detector, and can be positioned under the teats of the animal to be milked on the basis of the data supplied by the detector whereby they can be coupled to the animal's teats either simultaneously by an upward motion, or individually, e.g. when, after a teat cup has been connected,it is kicked from the udder by the animal. Whether or not the cups are connected to the animal's teats simultaneously they can be disconnected separately.

The invention not only relates to an apparatus for milking animals, but also to a method of automatically milking animals which are allowed to move about freely in a cow shed or pasture wherein they can individually approach a milking compartment provided with milking robot, and can be automatically identified by means of a computer prior to being milked, the computer being utilized among other things for recording the point of time that the animal has was milked.

Such a method is known from e.g. European Patent application No. 0091892, wherein, however, an animal is not automatically milked within a predetermined time span. A drawback of this method is that a certain frequency or rhythm of milkings is imposed on the animals to a relatively extreme extent. It is an object of the present invention to provide a method of milking using a different criterion, preferably an animal-dependent one, for deciding whether or not an animal arriving at the milk compartment is to be milked. According to the invention, this is feasible when the computer also serves to record the amount of milk produced in each milking, to record the periods of time between such milkings, to calculate the amount of milk produced between the point of time the animal last reported to a milking compartment and the previous milking of the animal present, and based on such data, to calculate the expected milk yield of the animal and to activate the milking robot on condition that the expected milk yield of said animal present will exceed a base value.

By such a method, the frequency at which each of the animals will be milked is dependent on data which is characteristic of the animal. The animals are thus better positioned to pursue their own frequencies of milking because the amount of milk generated in each animal's udder for a given period of time is different for each animal. By this scheme, one animal, e.g. a high-yielder, may be milked a second time earlier than another one having a lower yield.

Furthermore, the invention also relates to an apparatus for automatically milking of dairy animals, comprising a computer, at least one milking compartment arranged for milking an animal and at least one milking robot for applying teat cups, which apparatus may be provided with a selection area leading to the milking compartment and include means for identifying, by means of the computer, an animal that has arrived in the compartment, whereby the computer is provided with a program with the aid of which the apparatus is suitable for recording the amount of milk produced during each milking, for calculating the average daily production, as well as the respective milk yield to be expected, and for activating the milking robot on condition that the calculated expected milk yield exceeds a base value.

Inasmuch as the milking robot need not be in continuous use, animals can enter the milking compartment without being milked there. In that case the animal can be given some fodder (concentrate). The moment fodder is supplied to a specific animal can be recorded in the computer and may be relevant for deciding whether or not the animal will be milked when it enters the milking compartment next time. Therefore, the invention further relates to a method of automatically milking animals which are allowed to move about freely in a cow shed or grazing area and to approach a milking compartment provided with a milking robot, whereby said animals are automatically identified by means of a computer in order to decide whether the animal will be milked in the milking compartment by the milking robot, characterized in that the computer is further utilized for recording the amount of milk produced by the animal during milking, calculating on the basis of this date the expected milk yield of the animal, and activating the milking robot on condition that the calculated milk yield expected to be produced by said animal will exceed a base value.

Further, the invention relates to an apparatus wherein the method is applied.

Besides using the expected milk yield as criterion for milking an animal, another criterion may be the amount of fodder supplied to an animal during a certain time period. Therefore, the invention further relates to a method of automatically milking animals which are allowed to move about freely in a cow shed or grazing area and to approach a milking compartment provided with a milking robot, where animals can be automatically identified by means of a computer prior to being milked, in which method the computer is utilized for recording the times when an animal visits the milking compartment and received fodder therein, characterized in that the computer is further utilized for:

calculating and recording the weight of the fodder eaten by the animal when it visits the milking compartment;

activating the milking robot on condition that since the last milking the total amount of fodder eaten by the animal exceeds the base value.

Also, the invention relates to a construction wherein the latter method is applied.

Another criterion for milking an animal may be the time that has elapsed since the animal was last fed in the milking compartment. Therefore, the invention further relates to a method of automatically milking animals which are permitted to find their way individually to one or more milking compartments, at which the animals are automatically identified with the aid of a computer connected to identification means, characterized in that the computer is utilized for the recording of the points of time at which an animal is fed at the milking compartment and to activate, provided that a predetermined period of time has passed after the animal in question was last fed in the milking compartment, a device for placing the fodder within reach of the animal, while a device for the automatic milking of animals commences to operate. Again, the invention also relates to a construction wherein the latter method is applied. Because it is preferable to milk high productive animals before other animals, the invention also relates to an apparatus for automatically milking animals, comprising a computer, at least one milking compartment arranged for the milking of an animal and at least one milking robot for applying teat cups to the teats of the animal and for milking the animal, which apparatus includes means, cooperating with the computer, for identifying an animal that has arrived at the milking compartment, characterized in that the apparatus is constructed in such a way that it is suitable for recording the amount of milk produced in a predetermined time period, e.g. the last twenty-four hours, calculating on the basis of this data the expected milk yield, providing preference to animals to enter the milking compartment that have an expected milk yield which exceeds the average yield of the animals being milked.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
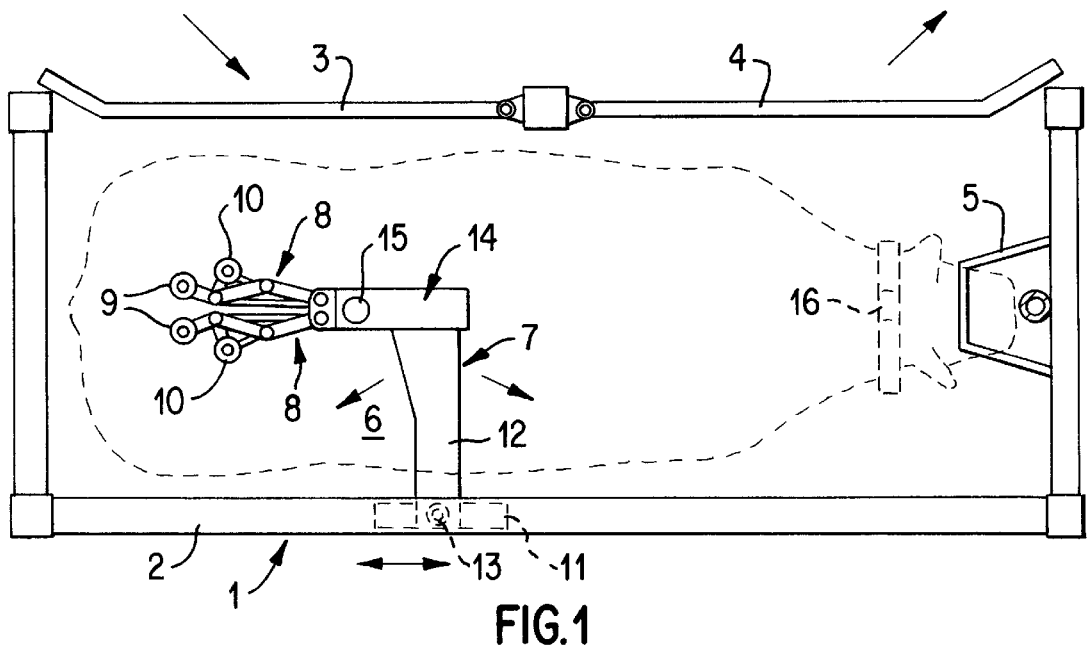
FIG. 1 is a plan view of a milking compartment incorporating a milking robot and showing the outline of the animal to be milked, a cow in the present case.
Figure 6A:
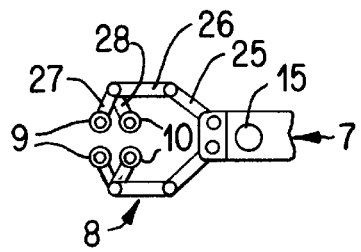
FIGS. 6A, 6B, 6C and 6D show four positions the teat cups can assume with respect to the end of the robot arm.
Figure 6B:
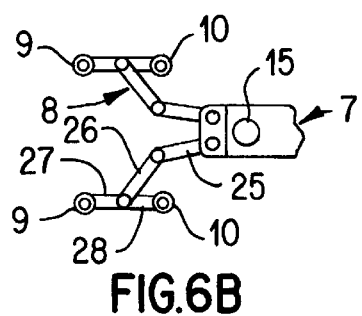
Figure 6C:
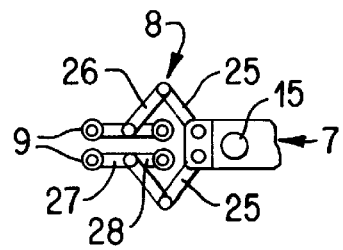
Figure 6D:
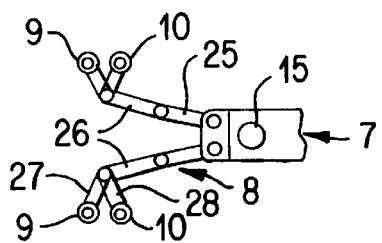

FIG. 1 is a plan view of a milking compartment 1 (also known as a milking parlor or simply a milk box), which includes a railing 2 and along one side an entrance door 3 and an exit door 4. A feed trough 5 is fastened to railing 2 at the forward end of milking compartment 1. At the side opposite the entrance door and the exit door is a milking robot 6. Milking robot 6 includes a robot arm 7, to the end of which two pairs of teat cups 9 and 10 are connected with the aid of two pivotal arm constructions denoted generally by reference numeral 8. Robot arm 7 is assembled from a first portion 11 which is arranged at the side of the milking compartment so that it is movable in the longitudinal direction of milking compartment 1. A second portion 12 is rotatable with respect to the first portion 11 about an upwardly directed shaft 13, together with a third portion 14 which is rigidly connected to second portion 12 at a substantially right angle. Robot arm 7 can be moved upwards as an integral whole by means of a conventional cylinder/piston unit (not shown). Also the movement of the robot arm 7 in the longitudinal direction of milking compartment 1 and the rotation of second robot arm portion 12 about shaft 13 is accomplishable by a further conventional cylinder/piston units (not shown). These cylinder/piston units may be either hydraulically, pneumatically or electromechanically activated.

A detector 15, e.g. a laser detector, is accommodated on the third robot arm portion 14. By means of such detector the positions of the teats of an animal to be milked are ascertained. Pivotal arm constructions 8, at the end of each of which teat cup pairs 9 and 10 is fitted, are pivotally connected to the end of the third robot arm portion 14. In addition, a collar including a transponder 16, which is part of a conventional cow identification system (not shown) is provided around the neck of the cow. Transponder 16 co-operates with a sensor which may be placed near feed trough 5 and is in communication with the computer of the system.

Figure 2:
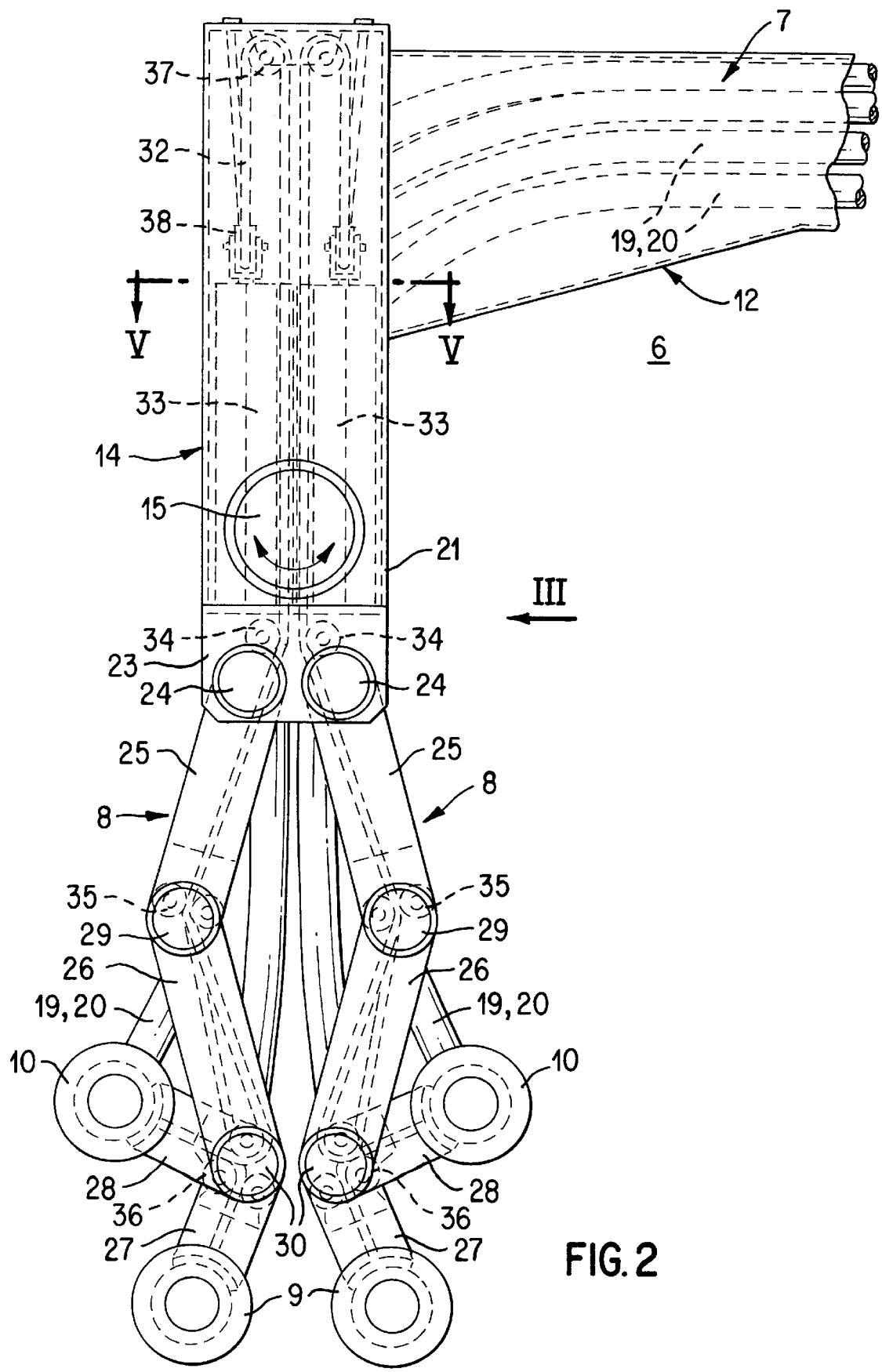
FIG. 2 shows, in a plan view to an enlarged scale, the end of the milking robot of FIG. 1, wherein two pairs of teat cups are coupled to the end of a robot arm, each via a separate pivotal arm construction.
Figure 3:
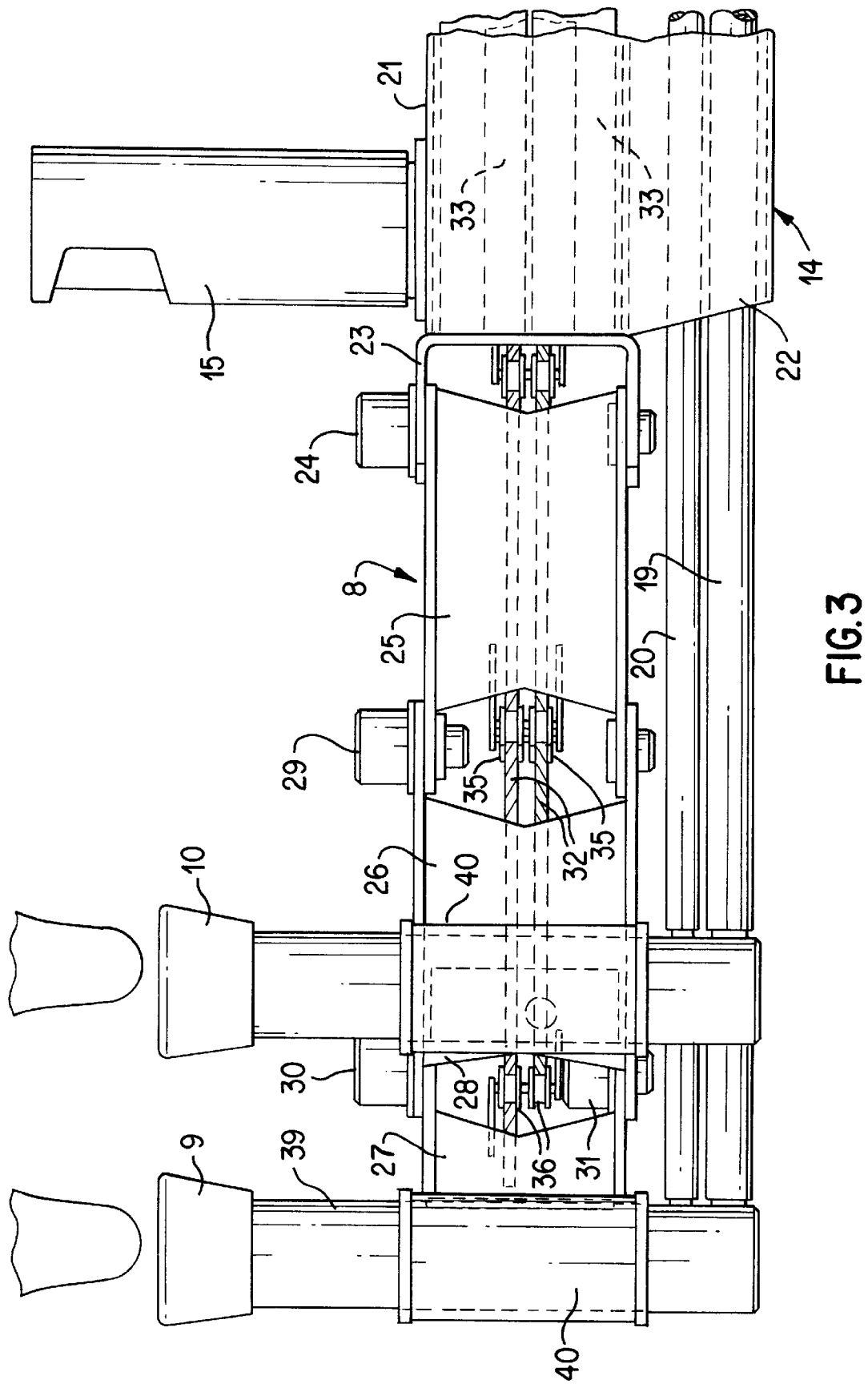
FIG. 3 is a side elevational view of the end of the robot arm depicted in the direction of the arrow III in FIG. 2.

FIGS. 2 and 3 are detailed representations of the end of robot arm 7, third robot arm portion 14 together with the pivotal constructions 8. Second portion 12 of robot arm 7 consists of a first box-like beam and a second box-like beam disposed thereunder. The milk tubes 19 and the pulsation tubes 20 of teat cups 9 and 10 are received in the lower second box-like beam. The second robot arm portion 12 is rigidly connected to the third robot arm portion 14. Also the third robot arm portion 14 includes a first box-like beam 21 and, arranged thereunder, a second box-like beam 22, these box-like beams 21 and 22 being connected with corresponding box-like beams of the second robot arm portion 12. Here, also milk tubes 19 and pulsation tubes 20 extend through the lower box-like beam 22.

The laser detector 15 is disposed pivotably or rotatably on the third robot arm portion 14. A holder 23 is secured to the end of the third robot arm portion 14, in which holder the two pivotal arm constructions 8 are accommodated so that they are rotatable about predominantly vertically extending pivot shafts. The pivotal arm constructions 8 can be rotated with respect to holder 23 with the aid of electric motors 24, which are in the form of stepping motors. Each of the two pivotal arm constructions 8 includes four pivotal arms 25, 26, 27 and 28. Pivotal arms 25 are rotatable in a predominantly horizontal plane with respect to the third robot arm portion 14 with the aid of the stepping motors 24. Pivotal arms 26 are rotatable in a predominantly horizontal plane with respect to arms 25 with the aid of electric motors, more specifically stepping motors 29. Arms 27 and 28 are both capable of rotating in a predominantly horizontal plane relative to arms 26 with the aid of electric motors, more specifically stepping motors 30 and 31, the shafts of which are in vertical alignment. Stepping motors 24, 29, 30 and 31 are disposed in the pivot points of the pivotal arm constructions 8.

Figure 5:
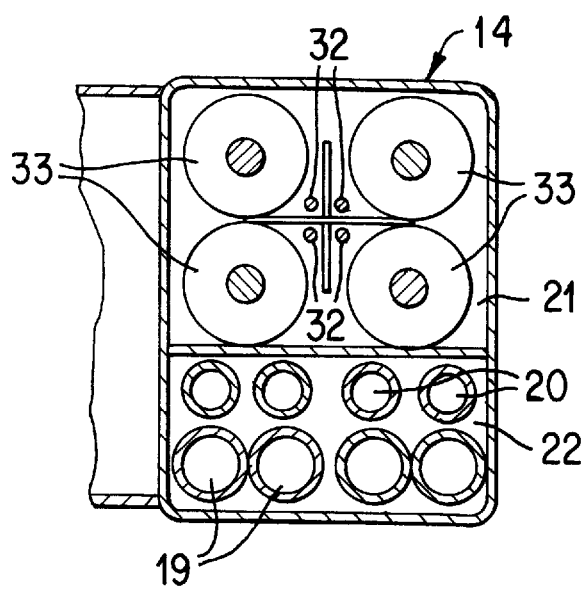
FIG. 5 is a cross-sectional view taken on the line V—V in FIG. 2.

With the aid of the two pivotal constructions 8, each assembled from four pivotal arms 25, 26, 27 and 28 and four stepping motors 24, 29, 30 and 31, teat cups 9 and 10 can be moved in many configurations under the udder with respect to robot arm 7 whereas detector 15 remains in a generally stationary position under the animal. Detector 15 is positioned in a fixed position relative to milking compartment 1, which facilitates searching for and finding the teats. FIGS. 6A, 6B, 6C and 6D show four configurations teat cups 9 and 10 may be moved to by stepping motors 24, 29, 30 and 31. By moving milking robot 6 in the longitudinal direction of milking compartment 1 and by pivoting robot arm 7 about upright shaft 13, robot arm 7 and consequently detector 15 can always be placed under the animal so that by operating stepping motors 24, 29, 30 and 31, teat cups 9 and 10 can be moved directly under the teats of the animal to be milked, whereby they can be connected to the animal's teats by an upward motion of robot arm 7 and by a vacuum produced in the teat cups. After the teat cups have been connected, robot arm 7 can be moved downwardly and slightly forwardly. When this occurs, teat cups 9 and 10, now connected to the teats, remain connected with robot arm 7 by flexible elements 32, e.g. cables or cords. One end of each flexible element 32 is connected to a teat cup 9 or 10 and its other end is connected to a cylinder/piston unit accommodated in the third robot arm portion 14, which cylinder/piston unit may be a pneumatic, hydraulic or electromechanical one. The cylinder/piston units provided for all four teat cuts are denoted in FIGS. 2, 3 and 5 by reference numeral 33. When teat cups 9 and 10 are not connected to the teats of an animal, they are pulled by cylinder/piston units 33 and flexible elements 32 up taut against the ends of the respective pivotal arms 27 and 28. As soon as the teat cups have been connected to the teats, the tension on flexible elements 32 imposed by cylinder/piston units 33 is released, so that robot arm 7 can be moved and the teat cups continue to be freely movable with respect to robot arm 7. When a given udder quarter has been stripped, which may be detected with the aid of a flow sensor in the relevant milk line, then the vacuum in the relevant teat cup is removed and simultaneously the relevant cylinder/piston unit 33 is energized, so that, when the teat cup drops from the test, it is immediately pulled against the end of the relevant pivotal arm 27 or 28. The various pivotal arms are movable relative to each other and in combination are movable relative to the third robot arm portion 14, in which cylinder/piston units 33 are accommodated. Each flexible element 32 must therefore be threaded along a plurality of pulleys near the pivot points between the pivotal arms 25, 26, 27 and 28 and between pivotal arms 25 and the third robot arm portion 14. For each pivotal arm construction 8 there is a set of pulleys for each of flexible elements 32 therein, by means of which the relevant teat cups 9 and 10 are connected to two cylinder/piston units 33 located one above the other inside the third robot arm portion 14. For both flexible elements 32 these sets of pulleys are located one above the other. Each set of pulleys for a single flexible element 32 includes pulley 34 arranged near the pivot point between pivotal arm construction 8 and the third robot arm portion 14, a pair of pulleys 35 near the pivot point between the pivotal arms 25 and 26 and a pair of pulleys 36 near the pivot point between the pivotal arm 26 on the one hand and the respective pivotal arms 27 and 28 on the other hand. By successfully passing each flexible element 32 from its point of connection at a teat cup between two pulleys 36 and two pulleys 35 and thereafter around a pulley 34 to the point of connection at the relevant cylinder/piston units 33, each flexible element 32 is accommodated in such a manner in the pivotal arm construction 8 that the freedom of motion of the teat cups relative to the robot arm 7 continues to be ensured to the maximum extent possible, when these cups are moved into predetermined configurations to under the teats of an animal. In particular, various configurations, such as those shown in FIGS. 6A, 6B, 6C and 6D can be obtained without difficulty. The points of connection of flexible elements 32 at the operating cylinder/piston units 33 are located at that side of the third robot arm portion 14 that is remote from the pivotal arm constructions 8. Each of the flexible elements extends from a teat cup between pairs of pulleys 36 and 35 and along a pulley 34 through the entire third robot arm portion 14 to the rear side thereof and from there via a pulley 37 to a pulley 38 disposed at the rear side of the cylinder/piston unit 33 and from there to the rear wall of the third robot arm portion 14. By passing the flexible element 32 along pulleys 37 and 38 the effective stroke of the flexible element is double that of operating cylinder/piston unit 33.

Figure 4:
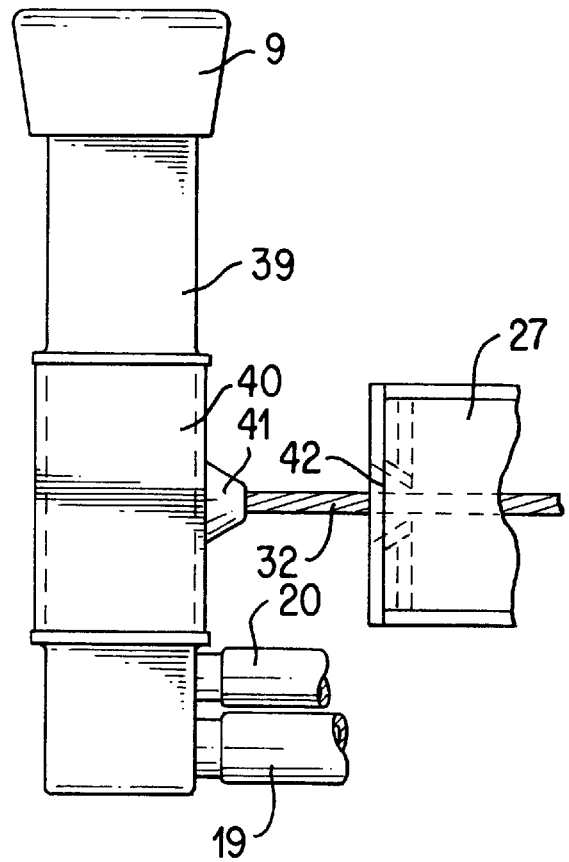
FIG. 4 illustrates a teat cup and the manner in which it is connected by means of a cable to the end of a pivotal arm of the milking robot.

With the ample freedom of motion of teat cups 9 and 10 with respect to robot arm 7, it is advantageous that milk and/or pulsation tubes 19 and 20, respectively, connected to the teat cups do not obstruct this freedom of motion of the teat cups insofar as possible. To achieve this, the teat cups are connected to the pivotal arm constructions 8 so as to be capable of rotating freely about their own longitudinal axis. As is shown in FIG. 4, this is effected by disposing a sleeve 40 around the exterior housing 39 of the teat cups. Flexible element 32 then acts on sleeve 40. Because of the capability of the teat cup to rotate freely in the sleeve 40, the milk and pulsation tubes do not impede movement by the pivotal arms. So that sleeve 40 can be pulled in the appropriate manner against the end of the relevant pivotal arm of the pivotal arm construction, sleeve 40 is provided with a protrusion 41, which co-operates with a seat 42 in the ends of pivotal arms 27 and 28, respectively.

If, after the teat cups have been connected to the teats of the animal to be milked, one of the teat cups drops from its teat, e.g. due to being kicked by the animal, then this teat cup is immediately pulled up against the end of the relevant pivotal arm and it is replaced by determining, once again with the aid of the detector, the position of the teat from which the cup dropped. In this situation, the stepping motors of the relevant pivotal arm construction are controlled so that the loose teat cup is moved to under said teat, whereafter the robot arm is moved upwards and a vacuum is produced in the teat cup until the cup grips the teat. With the individually controllable test cups it is possible for the teat cups to be connected both simultaneously and individually.

The method according to the invention is used in a milking apparatus for automatically milking animals, as described above. Entrance door 3 and exit door 4 normally connect with a grazing or other area for animals, such as a cowshed or pasture. Through a suitable measuring element, the computer is capable of determining the amount of milk produced during each milking of each animal and of recording it, together with the duration and time of the milking, into an electronic memory. The milking apparatus also includes an identification element or sensor, which communicates with the computer, enabling an animal to be identified. In the present embodiment, this sensor is provided in the milking compartment near feed trough 5. However, the sensor may equally well be provided outside the milking compartment for pre-selecting the admission of the animals into the milking compartment. The present embodiment makes use of a known identification system, wherein the sensor operates in conjunction with the transponder 16 on the collar of each of the animals.

The present embodiment, entrance door 3 and exit door 4 of the milking compartment are automatically controllable through the computer. In the initial position, entrance door 3 is open and it is automatically closed when the presence of an animal within milking compartment 1 has been established. When the animal is identified by the computer, the computer records the actual time when the animal reports herself in the milking compartment. On the basis of the relevant animal's recorded history data on her previous milkings, the amount of milk given in each milking and on the basis of the time the animal enters the milking compartment as determined by the computer, the expected amount of milk to be given by that animal is then determined by the computer. For this purpose, the computer derives from the recorded data what is the average milk productivity or milk yield per unit of time of the relevant animal, expressed in liters/hr in the present invention, and the length of time between the instant of identification and the latest milking of the animal present. Then, the product of the average milk productivity of the animal per unit of time and said length of time is the total milk yield to be expected. If the milk yield to be expected is higher than a base value to be set, e.g. amounting to six liters, the computer activates the milking robot to milk the animal. When the milking of the animal has been completed or when the amount of milk to be expected does not exceed the base value, exit door 4 is opened by the computer so that the animal, whether or not it has been milked, is automatically caused to exit, and thus leaves the milking compartment. The amount of milk produced by an animal will be the base on which the computer will decide if the animal will be milked again, when it returns to the milk compartment.

According to the present invention, the value of the average milk yield per unit of time of each individual animal is determined automatically by means of a progressive average derived from the recorded data per animal. Upon identification of the animal in the milk compartment, a calculation is made each time for this purpose on the basis of a number, ten in the present embodiment, of such record entries concerning previous milkings of the animal. In doing so, the milk yield of the set number of milkings is summed and the sum is divided by the difference in time between the instant of the last milking recorded and that of the milking preceding the final milking of the set number of milkings to be included in the calculation. According to the invention, the possibility that an animal does not produce milk in the relatively short periods that she is in the milking compartment to be milked each time, can be disregarded.

According to an alternative embodiment of the invention, the described identification of the animal and the determination of the milk yield to be expected can already have taken place in a buffer area or selection area associated with the milking compartment, in which area the entrance to the milking compartment is incorporated. For this purpose, such a buffer area comprise a sensor communicating with the computer for identifying an animal present therein, an exit to be opened controlled by the computer that provides access to an area when the animal can move about freely in a cow house or pasture and a similar exit providing access to the milking compartment. In the present embodiment, the animal present in the buffer area is led into the said housing or grazing area if the milk yield to be expected does not exceed the base value, whereas it is led into the milking compartment if the milk yield to be expected exceeds the base value. In the latter case, identification in milking compartment 1 is not required and it is possible to proceed with milking of the animal immediately. However, according to the invention, a simpler but less elegant pre-selection can also be effected by simply providing an identification sensor near entrance door 3 of milking compartment 1. Entrance door 3 is then not opened until an animal reports which is allowed to be milked under the above-described criterion. Animals which are not to be milked under the criterion of the invention leave the vicinity on their own account or are pushed away from entrance door 3 by other animals.

According to the invention, the embodiments set forth hereinbefore have the advantage that the decision of whether or nor a reporting animal will be milked is made by means of a pre-condition which, in a simple manner, relates to the production of each of the animals. For, by the present method, high-yield dairy animals will be milked earlier and more frequently than relatively low-yield animals, which has a favorable effect on the health of the animals and the efficiency of the milking apparatus in use. Because milk production in animals, at least in cows, after a first phase in which it varies linearly with time, is followed by a phase with diminishing returns, it is considered that, by causing the milkings to occur as early as feasible, the method according to the invention leads to increases in the milk yield per day, especially for high-yield animals.

Furthermore, the method set forth may also be adopted to a milking apparatus having a plurality of milking compartments or a plurality of milking robots or both, and the number of selection areas should not be considered a limitation to application of the invention. Accordingly, it should be appreciated that the invention is not limited to what is disclosed, but it also relates to modifications and alternative constructions which fall within the scope of the following claims.

Having disclosed our invention, what we claim as new and to be secured by Letters Patents of the United States is:

1. An apparatus for automatically milking animals, such as cows, comprising a milking robot which is provided with teat cups, a robot arm having movable arms, at least one of said teat cups being movably connected by one of said movable arms to said robot arm, said one teat cup being capable of free movement within limits in respect to said movable arms and being connected to said one movable arm by an elongated flexible element, and said elongated flexible element comprising a means for pulling said teat cup into a rigid connection with said movable arm.

2. A construction as claimed in claim 1, wherein at least two of said teat cups are individually and non-simultaneously connectable to the teats of an animal.

3. An apparatus as claimed in claim 1, further comprising a computer, identification means at said milk compartment co-operating with said computer for identifying an animal that has entered said milk compartment, said computer being programmed to record the points of time at which an animal in said milk compartment has previously been fed in said milk compartment and to activate in the event a predetermined time has passed after the animal in question was last fed in said milk compartment, a device in said milk compartment to provide fodder to the animal, and at the same time to activate said milking robot automatically to milk said animal.

4. An apparatus in accordance with claim 1, comprising holder means, said one teat cup being supported by said holder means so as to be movable relative thereto, said elongated flexible element being connected to said holder means.

5. An apparatus as claimed in claim 1, wherein said teat cups including said one teat cup are connected to said movable arms, said movable arms being pivotably connected to said robot arm so that selectively, as seen in plan view in a first position, they can be located near the midway point of the animal's udder and in a second position, also seen in plan view, they can be located remote from said midway point of the animal's udder.

6. An apparatus for automatically milking animals, such as cows, comprising a milking robot provided with a teat cup and coupling means for automatically connecting said teat cup to an animal being milked, said coupling means comprising a cord providing said teat cup with a means for, selectively, limited free movement with respect to said coupling means or rigid attachment to said coupling means, at least two of said teat cups being selectively connectable by said coupling means to the teats of an animal, simultaneously or individually and non-simultaneously.

7. An apparatus for automatically milking animals, such as cows, comprising a milking robot provided with teat cups and coupling means for automatically connecting said teat cups to an animal being milked, said milking robot further comprising a robot arm and a teat cup holder connected to said robot arm by an elongated flexible element, at least one said teat cup is movably mounted in said teat cup holder, and lulling means connected to said elongated flexible element for withdrawing said one teat cup while mounted in said teat cup holder from under its corresponding teat and moving it into a taut relationship with said robot arm wherein said elongated flexible element is in a state of tension.

8. An apparatus in accordance with claim 7, wherein said robot arm comprises a seat which is configured to receive said one teat cup.

9. An apparatus in accordance with claim 7, wherein said one teat cup is rotatably mounted in said teat cup holder.

10. An apparatus for automatically milking animals, such as cows, comprising a milking robot having a robot arm which is provided with a teat cup and holder means for said teat cup, said teat cup being connected to said robot arm via said holder means so as to be capable of rotation about a longitudinal axis of said teat cup.

11. An apparatus for automatically milking animals, such as cows, comprising a milking robot provided with pivotable robot arms, each said pivotable robot arm comprising a teat cup holder on which is removably mounted a respective teat cup, said pivotable robot arms being capable of pivoting said teat cups so that in a first position, seen in plan view, said teat cups are located near a midway point of an udder and in a second position, also seen in plan view, said teat cups are remote from the midway point of the udder.

12. An apparatus in accordance with claim 11, comprising two pivotable robot arms, a pair of said teat cups mounted on each of said two pivotable robot arms.

13. An apparatus in accordance with claim 12, comprising stepping motors that interconnect said teat cups to said pivotable robot arms.

14. An apparatus in accordance with claim 13, wherein said stepping motors are connected to pivotable connections between in said pivotable robot arms.

15. An apparatus in accordance with claim 11, wherein each said pivotable robot arm comprises four stepping motors for pivoting said teat cups into said first and second positions.

16. An apparatus in accordance with claim 11, wherein each said teat cup comprises an exterior housing and each said teat cup holder comprising a sleeve, each said sleeve receiving a respective said exterior housing, said exterior housing being rotatable relative to said sleeve, said teat cups being mounted on said pivotable robot arms via said sleeves.

17. An apparatus as claimed in claim 11, comprising elongated flexible elements, said teat cups being interconnected to said pivotable robot arms by said elongated flexible elements.

18. An apparatus in accordance with claim 17, comprising cylinder/piston units which are connected to said elongated flexible elements at their ends opposite the connections of said elongated flexible elements to said teat cups.

19. An apparatus in accordance with claim 17, wherein each said teat cup comprises an exterior housing, a sleeve around said housing, a said flexible elongated element being interconnected to said teat cup by said sleeve.

20. An apparatus in accordance with claim 11, wherein said milking robot comprises a detector for determining the position of the teats of the animal to be milked, said detector being in a location during the connecting of said teat cups to the animal's teats whereby it is approximately in a central position under the animal to be milked.

21. An apparatus in accordance with claim 20, wherein said detector is located on said milking robot proximate said pivotable robot arms.

22. An apparatus in accordance with claim 21, comprising control means for computer controlling said pivotable robot arms to place said teat cups selectively in said first position or said second position in response to signals from said detector so that said teat cups are positioned under the teats of the animal to be milked and can be connected simultaneously to said teats by an upward motion.

23. An apparatus in accordance with claim 22, comprising elongated flexible elements connecting each said teat cup to a corresponding said pivotable robot arm, connection means associated with said elongated flexible elements for retaining said teat cups selectively taut against said pivotable robot arms or for playing out said elongated flexible elements so that said teat cups are loosely connected via said elongated flexible elements to said pivotable robot arms, said detector detecting when one of said teat cups is dislodged from a said teat during the milking of said animal and sending signals thereof to said control means so that said connection means draws said teat cup taut against its corresponding said pivotable robot arm and causes said robot arm to reconnect said dislodged teat cup to the relevant teat of said animal by an upward motion.

24. An apparatus in accordance with claim 22, comprising an individual sensor associated with each said teat cup, said sensor transmitting signals to said control means so that said pivotable robot arms can separately disconnect each of said teat cups from its corresponding teat.

25. An apparatus for automatically milking animals, comprising a computer, at least one milk compartment arranged for milking an animal, a set of teat cups, at least one milking robot for applying said set of teat cups to the animal's teats, identifying means associated with said computer for identifying an animal at said milk compartment, said computer being programmed for
   recording the amount of milk produced by an identified animal during a previous milking,
   calculating on the basis of this data the expected milk yield of the animal upon next being identified at said compartment, and
   selectively activating the milking robot when the expected milk yield of said animal will exceed a base value.

26. An apparatus according to claim 25, comprising an entrance to said milk compartment which can be selectively opened or closed, and wherein said identifying means comprises an animal-identification sensor which transmits an animal-identification signal to said computer and on the basis of said signal said computer automatically causes the entrance of said milk compartment to open.

27. A method for automatically milking animals, such as cows, wherein the animals to be milked are allowed to move about freely in an area and to approach a milk compartment provided with a milking robot for automatically milking the animals, comprising automatically identifying each of said animals by means of a computer in order to decide whether the identified animal will be milked in the milk compartment by the milking robot, said computer performing the steps of
   recording the amount of milk produced by the identified animal during a prior milking,
   calculating on the basis of this data the currently expected milk yield of the identified animal, and
   selectively activating the milking robot when the calculated milk yield expected to be currently produced by said identified animal will exceed a base value.

28. A method as claimed in claim 27 comprising said computer further performing the steps of recording of the points of time at which an animal was previously received in said milk compartment, determining that a predetermined period of time has passed after the animal in question was last fed in said milk compartment, activating a device to place fodder in reach of the animal, and at the same time automatically milking the animal while the animal is being fed in said milk compartment.

29. An apparatus for automatically milking animals, comprising a computer, at least one milk compartment arranged for milking an animal and at least one milking robot for applying teat cups to the teats of an animal in said compartment, said computer comprising means for identifying an animal that has arrived at said compartment, said computer calculating the point of time that an animal enters said milk compartment and selectively transmitting a signal to activate said milking robot, said signal being derived from a recording of the prior milk yield of said animal stored in said computer.

30. A method of automatically milking animals which have had their identity and milk producing history recorded in a computer, which are allowed to move freely in an area and to approach a milk compartment provided with a milking robot for automatically milking an animal in said milk compartment while fodder to be consumed by an animal is being provided in said milk compartment, said computer performing the steps of:
   calculating and recording the weight of the fodder consumed by each animal when it visits the milk compartment;

activating the milking robot to milk the animal in said compartment following a determination that, since the animal's last milking, the total amount of fodder consumed by the animal exceeds a base value.

31. An apparatus for automatically milking animals, comprising a computer, at least one milk compartment arranged for the milking of an animal, at least one milking robot for applying teat cups to the teats of the animal and for milking the animal, and identification means, co-operating with said computer, for identifying an animal that has arrived at said milk compartment, said computer being programmed to:

record the points of time an animal to be milked has entered said milk compartment and received fodder therein, calculate and record the weight of the fodder eaten by the animal when it is in said milk compartment, and activate said milking robot when since the animal's last milking the total amount of fodder eaten by the animal exceeds a base value.

32. An apparatus for automatically milking a herd of animals, comprising a computer, at least one milk compartment arranged for the milking of an animal, access means for selectively permitting or preventing animals from entering said milk compartment, at least one milking robot for applying teat cups to the teats of an animal and for milking the animal, identification means, co-operating with said computer, for identifying an animal that has arrived at said milking compartment, said computer being programmed to:

record the amount of milk produced by said identified animal in a predetermined time period, calculate on the basis of this data said identified animal's expected milk yield, and permit with preference the entry of identified animals into said milk compartment that have expected milk yields which exceed the average milk yield of animals in said herd.

33. An apparatus for automatically milking animals, such as cows, comprising a milking robot provided with pivotable robot arms on which are mounted teat cups, said pivotable robot arms being capable of pivoting said teat cups so that in a first position, seen in plan view, they are located near the midway point of the udder and in a second position, also seen in plan view, they are remote from the midway point of the udder and, wherein said pivotable robot arms comprise at least three pivotable articulations.

34. An apparatus for automatically milking animals, such as cows, comprising a milking robot provided with pivotable robot arms on which are mounted teat cups, said pivotable robot arms being capable of pivoting said teat cups so that in a first position, seen in plan view, they are located near the midway point of the udder and in a second position, also seen in plan view, they are remote from the midway point of the udder, each said pivotable robot arm comprising four stepping motors for pivoting said teat cups into said first and second positions and, wherein each said pivotable robot arm comprises three pivotable members.

35. An apparatus for automatically milking animals, such as cows, comprising a milking robot provided with pivotable robot arms on which are mounted teat cups, said pivotable robot arms being capable of pivoting said teat cups so that in a first position, seen in plan view, they are located near the midway point of the udder and in a second position, also seen in plan view, they are remote from the midway point of the udder and, further comprising elongated flexible elements, said teat cups being interconnected to said pivotable robot arms by said elongated flexible elements and, each said teat cup comprising an exterior housing, a sleeve around said housing, a said flexible elongated element being interconnected to said teat cup by said sleeve and, wherein each said sleeve comprises a protrusion and each said pivotable robot arm comprises a recess into which said protrusion may be received, a said elongated flexible element extending through said recess and being connected to said protrusion for pulling a corresponding said teat cup and its corresponding sleeve against a said pivotable robot arm, whereby the corresponding said protrusion is snugly received in the corresponding said recess.

\* \* \* \* \*